Patented Feb. 16, 1954

2,669,567

UNITED STATES PATENT OFFICE 2,669,567

SUBSTITUTED BENZOYL HALIDES

Quentin E. Thompson, St. Louis, Mo., assignor to Monsanto Chemical Company, St. Louis, Mo., a corporation of Delaware No Drawing. Application December 7, 1951, Serial No. 260,568

10 Claims. (Cl. 260—293.4)

This invention relates to (alkyl-1-piperidylsulfonyl) benzoyl halides having the formula

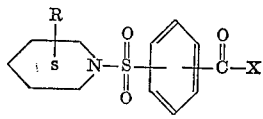

wherein R represents an alkyl radical, preferably containing from 1 to 5 carbon atoms, and X represents a halogen, and to a method for their preparation. The letter "s" in the formula above indicates a saturated ring structure.

The (2-alkyl-1-piperidylsulfonyl) benzoyl halides and the (3-alkyl-1-piperidylsulfonyl) benzoyl halides as described above contain an asymmetric carbon atom. As a result thereof these compounds exist in two optically active forms, namely, the dextro-rotary (d) and levo-rotary (l). All such forms and mixtures of these isomers, as well as the (4-alkyl-1-piperidylsulfonyl) benzoyl halides which do not contain an asymmetric carbon atom, are contemplated as coming within the scope of this invention. All of the novel compounds of this invention can be used as intermediates for the preparation of various types of organic compounds. The optically active compounds just referred to are particularly useful as resolution agents for the resolution of racemic mixtures of optically active compounds reactive with the optically active isomers described above.

The novel (alkyl-1-piperidylsulfonyl) benzoyl chlorides and bromides of this invention may be conveniently prepared by reacting an (alkyl-1-piperidylsulfonyl) benzoic acid having the formula

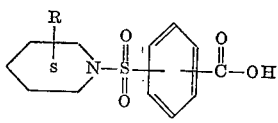

wherein R represents an alkyl radical, preferably containing from 1 to 5 carbon atoms, and a compound selected from the group consisting of phosphorus pentachloride, phosphorus trichloride, thionyl chloride, phosphorus pentabromide, phosphorus tribromide and thionyl bromide. The novel (alkyl-1-piperidylsulfonyl)-benzoyl iodides of this invention may be prepared by reacting the corresponding (alkyl-1-piperidylsulfonyl) benzoyl chloride with anhydrous hydriodic acid or calcium iodide. The novel (alkyl-1-piperidylsulfonyl) benzoyl fluorides of this invention may be prepared by reacting the corresponding (alkyl-1-piperidylsulfonyl) benzoyl chloride with potassium fluoride.

The following examples are illustrative of the novel compounds of this invention and their method of preparation:

Example I 21 g. of $PCl_5$ is slowly added to 28.3 g. of d-p-(2-methyl-1-piperidylsulfonyl) benzoic acid suspended in about 60 ml. of chloroform. The reaction occurs immediately without heating, although towards the end of the reaction gentle heating is necessary. When no more hydrogen chloride is evolved upon the addition of $PCl_5$, the $POCl_3$ formed in the reaction and the chloroform which served as a reaction medium are removed from the reaction mixture by distillation under a reduced pressure of about 14 mm. Hg at a temperature of approximately 90° C., leaving an excellent yield of substantially pure d-p-(2-methyl-1-piperidylsulfonyl) benzoyl chloride having the following physical constants:

Melting point, 84–85.5° C.
Optical rotation $[a]_D^{25°} = +33.8°$ ($c=2$, chloroform)

Example II

The procedure set forth in Example I is repeated ultilizing l-p-(2-methyl-1-piperidylsulfonyl) benzoic acid in place of the d-p-(2-methyl-1-piperidylsulfonyl) benzoic acid. An excellent yield of substantially pure l-p-(2-methyl-1-piperidylsulfonyl) benzoyl chloride is obtained having the following physical constants:

Melting point 84–85° C.
Optical rotation $[a]_D^{25°} = -33.8°$ ($c=2$, chloroform)

Example III

In accordance with the procedure described in Example I, an excellent yield of substantially pure dl-o-(3-propyl-1-piperidylsulfonyl) benzoyl bromide is obtained utilizing the following ingredients:

31.1 g. of dl-o-(3-propyl-1-piperidylsulfonyl)-benzoic acid
43.1 g. of $PBr_5$
100 ml. of chloroform

Example IV 16.2 g. of d-m-(4-butyl-1-piperidylsulfonyl)-benzoyl chloride is dissolved in about 200 ml. of xylene. To this mixture is then added a large excess (about 26 g. in all) of anhydrous hydrogen iodide. This solution is allowed to stand over night at room temperature. The xylene and excess hydriodic acid are then removed from the reaction mixture by distillation under reduced pressure and the crude acyl iodide remaining is recrystallized several times from petroleum ether, thereby obtaining substantially pure d-m-(4-butyl-1-piperidylsulfonyl)benzoic iodide.

*Example V*

In accordance with the procedure described in Example I, an excellent yield of l-p-(2-pentyl-1-piperidylsulfonyl)benzoyl chloride is obtained utilizing the following ingredients:

34 g. of l-p-(2-pentyl-1-piperidylsulfonyl)benzoic acid
21 g. of PCl₅
100 ml. of chloroform

*Example VI*

29.6 g. of d-p-(2-ethyl-1-piperidylsulfonyl)-benzoic acid, 35.4 g. of thionyl chloride and 0.5 g. of pyridine are mixed together in a suitable container. Reaction begins immediately as evidenced by the evolution of SO₂ and HCl. When the gaseous evolution diminishes, the reaction mixture is warmed gently until all of the acid has dissolved and the gaseous evolution has ceased completely. The volatile by-products and excess thionyl chloride are then distilled from the reaction mixture under reduced pressure leaving an excellent yield of substantially pure d-p-(2-ethyl-1-piperidylsulfonyl)benzoyl chloride.

*Example VII*

The procedure set forth in Example VI is repeated utilizing 62.4 g. of thionyl bromide in place of the 35.4 g. of SOCl₂. An excellent yield of substantially pure d-p-(2-ethyl-1-piperidylsulfonyl)benzoyl bromide is obtained.

While the preceding examples have illustrated specific embodiments of this invention, substantial variation is possible in the reactants and the reaction conditions specified without departing from the scope of this invention. For example, the reaction of the (alkyl-1-piperidylsulfonyl)-benzoic acid and the phosphorus pentahalide may be carried out in any suitable reaction medium. Typical of the organic compounds which are particularly applicable as reaction mediums are chloroform, dioxane, benzene, xylene, etc.

The quantities of reactants used in preparing the novel compounds of this invention are also subject to substantial variation. Most advantageous results are obtained in preparing the (alkyl-1-piperidylsulfonyl)benzoyl chlorides and bromides of this invention when approximately equivalent proportions of phosphorus pentachloride, phosphorus trichloride, phosphorus pentabromide, or phosphorus tribromide and the particular (alkyl-1-piperidylsulfonyl)benzoic acid are employed or when from about 1 to about 5 molecular proportions of thionyl chloride or thionyl bromide for each molecular proportion of the particular (alkyl-1-piperidylsulfonyl)benzoic acid are employed.

The temperature at which the reaction is carried out may also be varied over a substantial range. Temperatures in the range of from about 20° C. to about 60° C. are particularly useful.

After the reaction is complete, the (alkyl-1-piperidylsulfonyl)benzoyl halide may be recovered from the reaction mixture by any convenient method. Usually this may be conveniently accomplished by removal of the volatile products under reduced pressure followed by distillation or recrystallization of the (alkyl-1-piperidylsulfonyl)benzoyl halide.

The (alkyl-1-piperidylsulfonyl)benzoic acids used in the novel process of this invention are described and claimed in my copending application Serial No. 260,569, filed December 7, 1951.

What is claimed is:

1. As new chemical compounds, optically active (alkyl-1-piperidylsulfonyl)benzoyl halides having the formula:

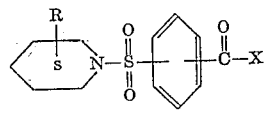

wherein the alkyl-1-piperidylsulfonyl radical is selected from the group consisting of 2-alkyl-1-piperdylsulfonyl and 3-alkyl-1-piperidylsulfonyl radicals, wherein R represents a lower alkyl radical and X represents a halogen.

2. As a new chemical compound, optically active p-(2-methyl-1-piperidylsulfonyl)benzoyl chloride.

3. A process for the preparation of optically active p-(2-methyl-1-piperidylsulfonyl)benzoyl chloride which comprises reacting optically active p-(2-methyl-1-piperidylsulfonyl)benzoic acid and phosphorus pentachloride and separating the resultant optically active p-(2-methyl-1-piperidylsulfonyl)benzoyl chloride.

4. As new compounds optically active (2-alkyl-1-piperidylsulfonyl)benzoyl chlorides having the formula

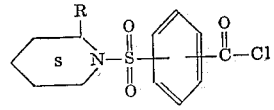

wherein R represents an alkyl radical containing from 1 to 5 carbon atoms.

5. As new compounds optically active (3-alkyl-1-piperidylsulfonyl)benzoyl chlorides having the formula

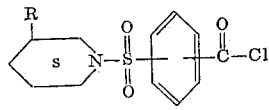

wherein R represents an alkyl radical containing from 1 to 5 carbon atoms.

6. As new chemical compounds optically active (2-methyl-1-piperidylsulfonyl)benzoyl chlorides having the formula

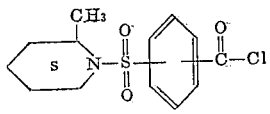

7. In a process for the preparation of the compounds of claim 1 the steps comprising reacting an optically active (alkyl-1-piperidylsulfonyl)-benzoic acid having the formula

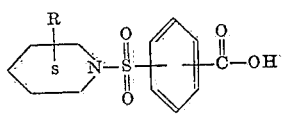

wherein the alkyl-1-piperidylsulfonyl radical is selected from the group consisting of 2-alkyl-1-piperidylsulfonyl and 3-alkyl-1-piperidylsulfonyl radicals and wherein R is a lower alkyl radical, with a compound selected from the group consisting of phosphorous pentachloride, phosphorous trichloride, thionyl chloride, phosphorous pentabromide, phosphorous tribromide, and thionyl bromide, and separating the resultant optically active (alkyl-1-piperidylsulfonyl) benzoyl halide.

8. In a process for the preparation of the compounds of claim 4 the steps comprising reacting an optically active (2-alkyl-1-piperidylsulfonyl)-benzoic acid having the formula

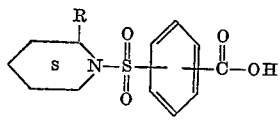

where R is an alkyl radical containing from 1 to 5 carbon atoms, with phosphorous pentachloride, and separating the resultant optically active (2-alkyl-1-piperidylsulfonyl) benzoyl chloride.

9. In a process for the preparation of the compounds of claim 5 the steps comprising reacting an optically active (3-alkyl-1-piperidylsulfonyl)-benzoic acid having the formula

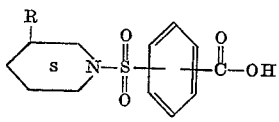

where R is an alkyl radical containing from 1 to 5 carbon atoms, with phosphorous pentachloride, and separating the resultant optically active (3-alkyl-1-piperidylsulfonyl) benzoyl chloride.

10. In a process for the preparation of the compounds of claim 6 the steps comprising reacting an optically active (2-methyl-1-piperidylsulfonyl)-benzoic acid having the formula

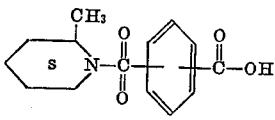

with phosphorous pentachloride, and separating the resultant optically active (2-methyl-1-piperidylsulfonyl) benzoyl chloride.

QUENTIN E. THOMPSON.

References Cited in the file of this patent

UNITED STATES PATENTS

| Number | Name | Date |
|---|---|---|
| 2,506,023 | Jenny et al. | May 2, 1950 |
| 2,506,024 | Jenny et al. | May 2, 1950 |
| 2,506,025 | Jenny et al. | May 2, 1950 |